(12) United States Patent
Panhans et al.

(10) Patent No.: US 12,097,863 B2
(45) Date of Patent: Sep. 24, 2024

(54) SYSTEM AND METHOD FOR COMPLETING A NEUTRAL PROFILE LEARNING TEST

(71) Applicant: Ford Global Technologies, LLC, Dearborn, MI (US)

(72) Inventors: Justin Panhans, Detroit, MI (US); Fazal Urrahman Syed, Canton, MI (US); Ameya Vivek Gadre, Ypsilanti, MI (US); Arun Sebastian, Dearborn, MI (US); Francis Thomas Connolly, Ann Arbor, MI (US); Minku Lee, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 17/655,406

(22) Filed: Mar. 18, 2022

(65) Prior Publication Data
US 2023/0294710 A1    Sep. 21, 2023

(51) Int. Cl.
*B60W 50/08* (2020.01)
*B60W 40/105* (2012.01)
*B60W 50/10* (2012.01)
*F02M 39/00* (2006.01)

(52) U.S. Cl.
CPC ........ *B60W 40/105* (2013.01); *B60W 50/085* (2013.01); *B60W 50/10* (2013.01); *F02M 39/005* (2013.01); *B60W 2510/0275* (2013.01); *B60W 2510/083* (2013.01)

(58) Field of Classification Search
CPC .. B60W 40/105; B60W 50/085; B60W 50/10; B60W 2510/0275; B60W 2510/083; F02M 39/005

USPC .......................................................... 701/70
See application file for complete search history.

(56) References Cited

U.S. PATENT DOCUMENTS

| | | | | |
|---|---|---|---|---|
| 4,277,830 | A * | 7/1981 | Reid | G01M 13/00 73/114.25 |
| 4,671,139 | A * | 6/1987 | Downs | F16H 61/061 74/731.1 |
| 5,336,932 | A * | 8/1994 | Barske | B60K 6/44 290/51 |
| 7,527,032 | B2 * | 5/2009 | Izelfanane | F02D 13/06 701/112 |
| 9,868,442 | B2 * | 1/2018 | Okabe | B60W 30/18054 |
| 10,036,347 | B1 * | 7/2018 | Sherry | F02B 63/04 |
| 11,551,489 | B1 * | 1/2023 | Rejeti | B60H 1/00978 |
| 11,746,838 | B1 * | 9/2023 | Bichkar | B60K 6/26 701/68 |
| 11,984,747 | B2 * | 5/2024 | Mitri | G01R 27/08 |
| 2002/0038733 | A1 * | 4/2002 | Obayashi | B60W 10/08 180/68.5 |
| 2002/0069011 | A1 * | 6/2002 | Hawkins | F02D 41/22 123/568.21 |

(Continued)

FOREIGN PATENT DOCUMENTS

DE    102023123237 A1 *  2/2024  ........... F16D 48/066

*Primary Examiner* — Richard A Goldman
(74) *Attorney, Agent, or Firm* — David Kelley; McCoy Russell LLP

(57) ABSTRACT

Systems and methods for operating a hybrid vehicle during an end of assembly line test are presented. In one example, torque of an integrated starter/generator (ISG) is adjusted so that the ISG may not affect engine data that is collected during end of assembly line engine testing. The collected engine data may be a basis for adapting engine operation.

20 Claims, 4 Drawing Sheets

(56) References Cited

U.S. PATENT DOCUMENTS

| | | | |
|---|---|---|---|
| 2003/0200957 A1* | 10/2003 | Shinogle | F02D 41/365 |
| | | | 123/480 |
| 2005/0085976 A1* | 4/2005 | Reibold | B60W 10/10 |
| | | | 701/51 |
| 2005/0126538 A1* | 6/2005 | Warne | F02D 41/123 |
| | | | 123/436 |
| 2006/0047382 A1* | 3/2006 | Morioka | G07C 5/0808 |
| | | | 701/31.9 |
| 2007/0129873 A1* | 6/2007 | Bernzen | F02D 41/021 |
| | | | 701/96 |
| 2010/0070121 A1* | 3/2010 | Ochiai | B60W 20/00 |
| | | | 903/903 |
| 2013/0158776 A1* | 6/2013 | Rini | B60R 16/0234 |
| | | | 701/29.4 |
| 2015/0197239 A1* | 7/2015 | Vilar | B60K 6/52 |
| | | | 180/65.265 |
| 2016/0229406 A1* | 8/2016 | Okabe | B60W 10/10 |
| 2017/0225670 A1* | 8/2017 | Johri | B60W 10/06 |
| 2017/0350332 A1* | 12/2017 | Martin | F02D 41/0087 |
| 2018/0058367 A1* | 3/2018 | Ottikkutti | F02D 41/403 |
| 2018/0134301 A1* | 5/2018 | Dudar | F02D 41/22 |
| 2020/0063400 A1* | 2/2020 | Takigawa | B60W 30/1886 |
| 2020/0160434 A1* | 5/2020 | Osumi | G06F 16/90335 |
| 2020/0331450 A1* | 10/2020 | Jonuscheit | B60W 10/023 |
| 2021/0237713 A1* | 8/2021 | Tabata | B60K 6/445 |
| 2021/0310428 A1* | 10/2021 | Bryan | F02D 41/0027 |
| 2022/0282684 A1* | 9/2022 | Ottikkutti | F02D 41/3094 |
| 2023/0294710 A1* | 9/2023 | Panhans | B60W 40/105 |
| | | | 701/70 |

* cited by examiner

SYSTEM AND METHOD FOR COMPLETING A NEUTRAL PROFILE LEARNING TEST

FIELD

The present description relates to methods and a system for completing a neutral profile learning test of a hybrid vehicle. The methods and system may be applied to hybrid vehicles that include an integrated starter/generator.

BACKGROUND AND SUMMARY

An engine of a hybrid vehicle may be operated to perform a test at an end of a manufacturing assembly line. The end of manufacturing line testing may provide data from which engine operation may be adapted. The data captured during end of line testing may be useful for compensating part to part variation, which may cause an engine to operate slightly different than a baseline engine without the compensation. For example, an amount of air flowing through an engine may deviate from a baseline engine due to tolerances in a cam phase actuator, camshaft variation, and other sources of variation. If the engine air flow is higher or lower than expected, the engine may experience knock, misfire, and/or lower efficiency than may be expected. Therefore, it may be desirable to determine if engine air flow and other engine conditions meet expectations after a driveline is manufactured. However, if the engine is coupled to an electric machine, the electric machine may affect engine data. Therefore, it may be desirable to provide a way of reducing influence of an electric machine on engine data during end of line testing.

The inventors herein have recognized the above-mentioned issues and have developed a method for operating a driveline, comprising: adjusting a torque applied to the driveline via an electric machine in response a request for a neutral profile learning test request; increasing a speed of an engine in response to the request for the neutral profile learning test request; and deactivating engine fuel injectors in response to the request for the neutral profile learning test request.

By adjusting torque of an electric machine to zero during end of line testing, it may be possible to provide the technical result of improving engine test data and collection. In particular, the electric machine may be commanded to generate zero torque instead of providing a reaction torque to charge a traction battery. Consequently, the engine may rotate in a way that is similar to a way an engine rotates when the engine is not part of a hybrid vehicle so that engine testing and adaptation procedures may not be influenced by a load that may be applied to the engine via the electric machine.

The present description may provide several advantages. In particular, the approach may improve engine characterization for hybrid vehicles. Further, the approach may maintain compatibility with existing engine characterization procedures for non-hybrid vehicles. Additionally, the approach may improve engine control for hybrid vehicles.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
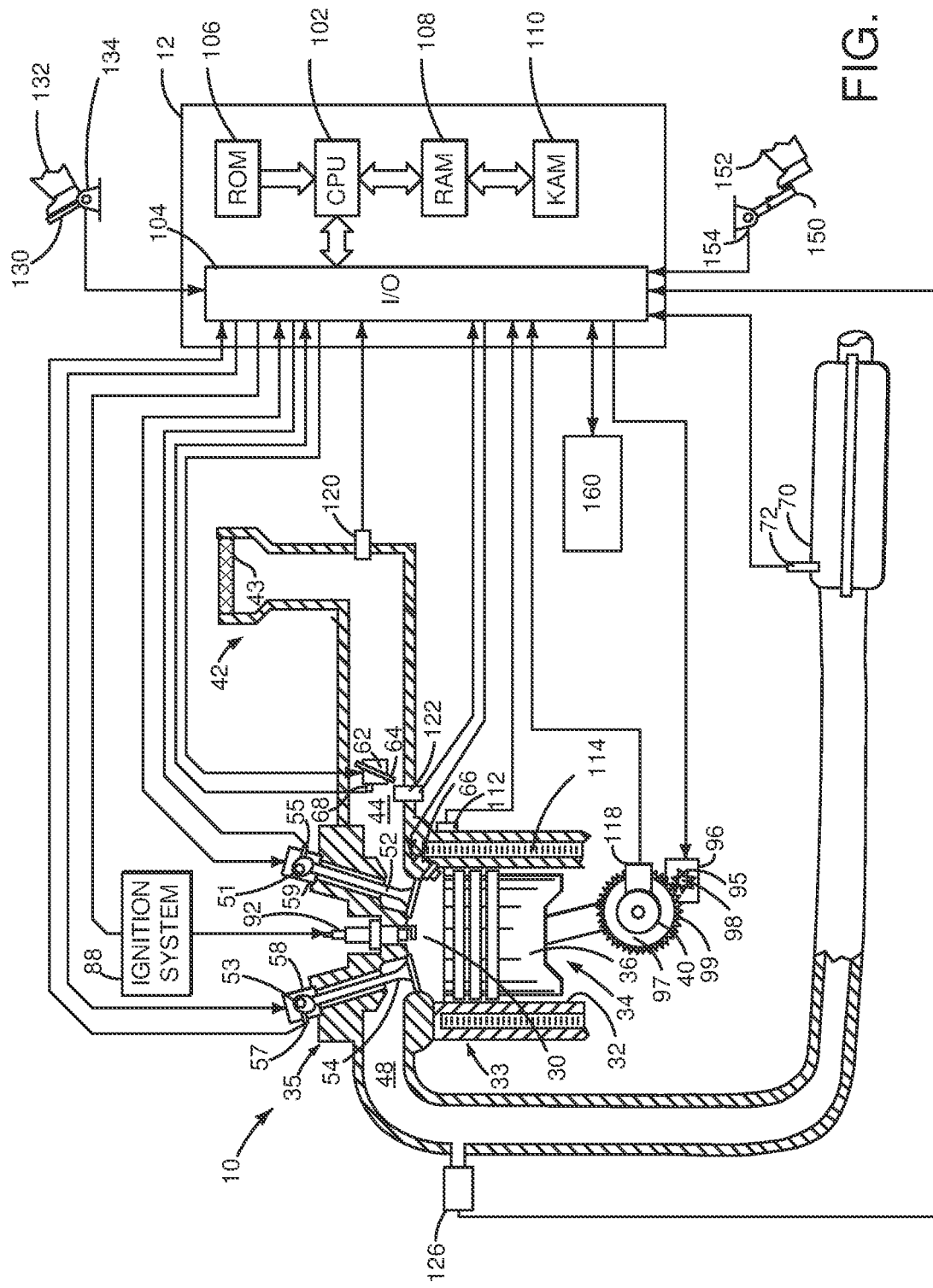
FIG. 1 is a schematic diagram of an engine.
Figure 2:
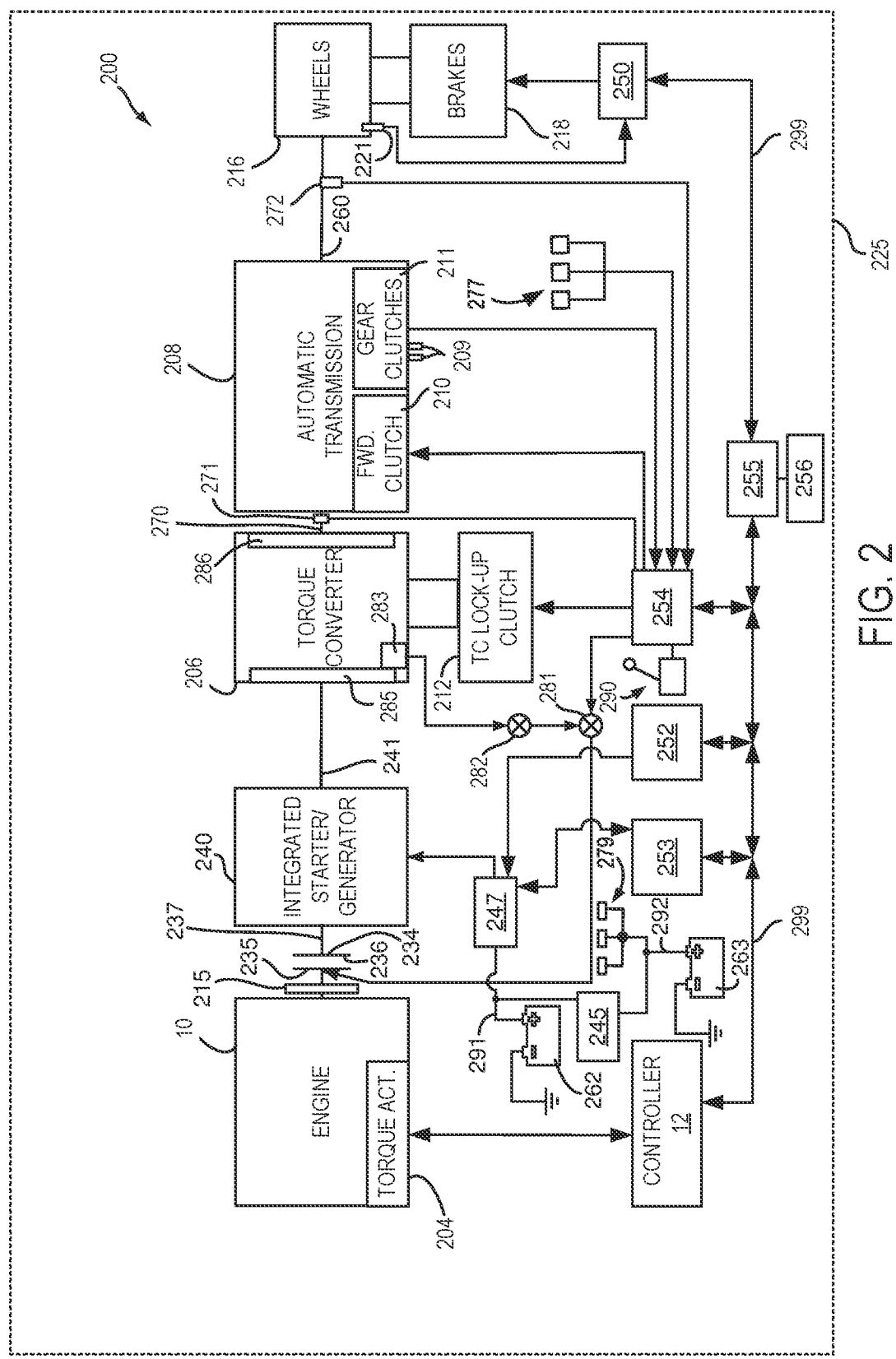
FIG. 2 is a schematic diagram of a hybrid vehicle driveline including the engine of FIG. 1.

The present description is related to improving data provided by engine sensors during a neutral profile learning test. The engine may be included in a hybrid vehicle that includes an integrated starter/generator (ISG). The ISG may supply positive torque to propel the hybrid vehicle or a negative torque to charge a traction battery. The engine may be of the type that is shown in FIG. 1. The engine may be part of a hybrid powertrain or driveline as shown in FIG. 2. A neutral profile learning test may be performed according to the sequence of FIG. 3. The neutral profile learning test may be performed according to the method of FIG. 4.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source, which may be referred to as a traction battery) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 (e.g., gears 1-10) and forward clutch 210. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG. Vehicle system controller 255 requests the engine power from controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from rotor and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, ISG temperature sensors, gear shift lever sensors, and an ambient temperature sensor. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine; an integrated starter/generator (ISG); a driveline disconnect clutch positioned in a driveline between the engine and the ISG; and a controller including executable instructions stored in non-transitory memory that cause the controller to adjust torque output of the ISG in response to a request for neutral profile learning. In a first example, the system includes where adjusting torque output of the ISG includes adjusting torque of the ISG to zero. In a second example that may include the first example, the system further comprises additional instructions to increase a speed of the engine in response to the request for neutral profile learning. In a third example that may include one or both of the first and second examples, the system further comprises additional instructions to deactivate fuel injectors of the engine after increasing the speed of the engine. In a fourth example that may include one or more of the first through third examples, the system further comprises additional instructions to collect output of one or more engine sensors in response to the request for neutral profile learning. In a fifth example that may include one or more of the first through fourth examples, the system includes where the one or more sensors include an engine air flow sensor. In a sixth example that may include one or more of the first through fifth examples, the system includes where the one or more sensors include an engine position sensor.

Figure 3:
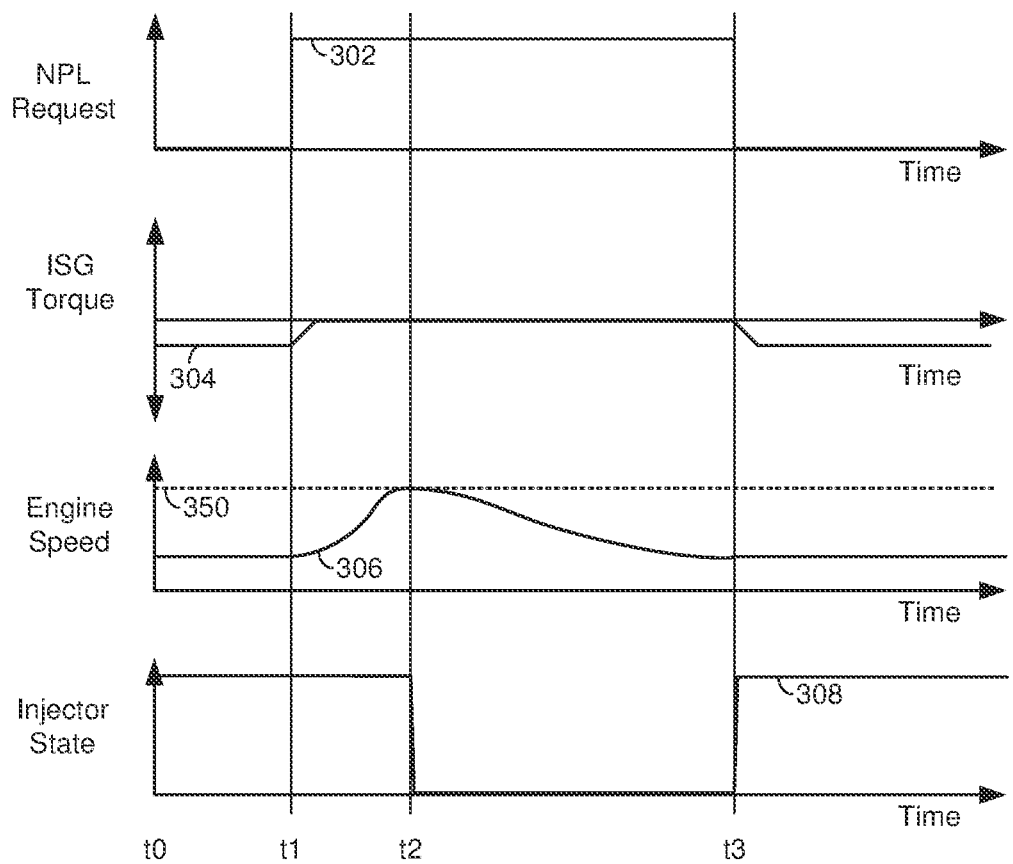
FIG. 3 shows an example engine of neutral profile learning according to the method of FIG. 4.

Referring now to FIG. 3, a prophetic driveline operating sequence is shown. The operating sequence of FIG. 3 may be provided via the system of FIGS. 1 and 2 in cooperation with the method of FIG. 4. The vertical lines at times t0-t3 represent times of interest during the operating sequence. The plots are time aligned. The sequence of FIG. 3 may be performed when a transmission of the hybrid vehicle is engaged in neutral or park. In addition, the driveline disconnect clutch is fully closed so that the ISG 240 is coupled to engine 10.

The first plot from the top of FIG. 3 is a plot of a state of a neutral profile learning (NPL) request versus time. The vertical axis represents the state of the NPL request and the NPL request is asserted when trace 302 is at a higher level that is near the vertical axis arrow. The NPL request is not asserted when trace 302 is near the horizontal axis. The horizontal axis represents time and time increases from the left side of the plot to the right side of the plot. Trace 302 represents the state of the NPL request.

The second plot from the top of FIG. 3 is a plot of integrated starter/generator (ISG) torque versus time. The vertical axis represents torque of the ISG (e.g., 240 of FIG. 2) and the magnitude of torque increases in directions away from the horizontal axis. The ISG torque amount at the level of the horizontal axis is zero ISG torque. The horizontal axis represents time and time increases from the left side of the plot to the right side of the plot. Trace 304 represents ISG torque.

The third plot from the top of FIG. 3 is a plot of engine speed versus time. The vertical axis represents engine speed and engine speed increases in the direction of the vertical axis arrow. The horizontal axis represents time and time increases from the left side of the plot to the right side of the plot. Trace 306 represents engine speed. Line 350 represents a threshold engine speed.

The fourth plot from the top of FIG. 3 is a plot of fuel injector state for the engine versus time. The vertical axis represents the fuel injector state and the fuel injectors are active (e.g., free to open and close as commanded) when the fuel injector state trace 308 is at a higher level that is near the vertical axis arrow. The fuel injectors are not active (e.g., held in a closed state) when the fuel injector trace 308 is at the level of the horizontal axis. Trace 308 represents the fuel injector operating state.

At time t0, the engine is running (e.g., rotating and combusting fuel) at idle speed. The NPL request is not asserted and the ISG torque is negative indicating that the ISG is providing a reaction torque to the driveline that places a load on the driveline and consumes power from the driveline to generate electric charge that is stored in a traction battery. The engine's fuel injectors are activated so as to inject fuel to the engine. The engine is being operated as part of an end of manufacturing assembly line test and calibration procedure.

At time t1, the NPL request is asserted. The NPL request may be generated via an external system or via instructions within controller 12. The magnitude of the ISG torque begins to be incrementally reduced or ramped to zero in response to the NPL request so that operation of the engine may be affected less significantly by the ISG 240 being coupled to the engine. The engine speed is also increased in response to the NPL request. The engine speed may be increased via increasing engine torque.

At time t2, engine speed exceeds threshold speed 350 so fuel injection to the engine is ceased as indicated by the fuel injector state. Ceasing fuel injection causes combustion within the engine to cease and engine speed to be reduced. The NPL request remains asserted and ISG torque is zero. In addition, output or data from engine sensors begins to be collected and stored in controller 12. Engine sensor data may include but is not limited to engine air flow, intake manifold pressure, engine speed, camshaft position, engine oil temperature, throttle position, and engine torque.

Between time t2 and time t3, the engine speed is reduced and engine sensor output data is collected to the controller 12. The NPL request remains asserted and ISG torque remains commanded to zero.

At time t3, engine speed is reduced to idle speed so the NPL request is withdrawn and fuel injectors are reactivated. The ISG torque magnitude is incrementally increased or ramped so that the ISG may continue to charge the traction battery. The data collected by the engine sensors may be applied to adapt operation of the engine to compensate for manufacturing component variation.

In this way, undesirable influence from an ISG may be reduced while NPL is being performed. Consequently, an engine NPL procedure may be performed in a time frame that provides useful engine data from which engine operation may be adapted.

Figure 4:
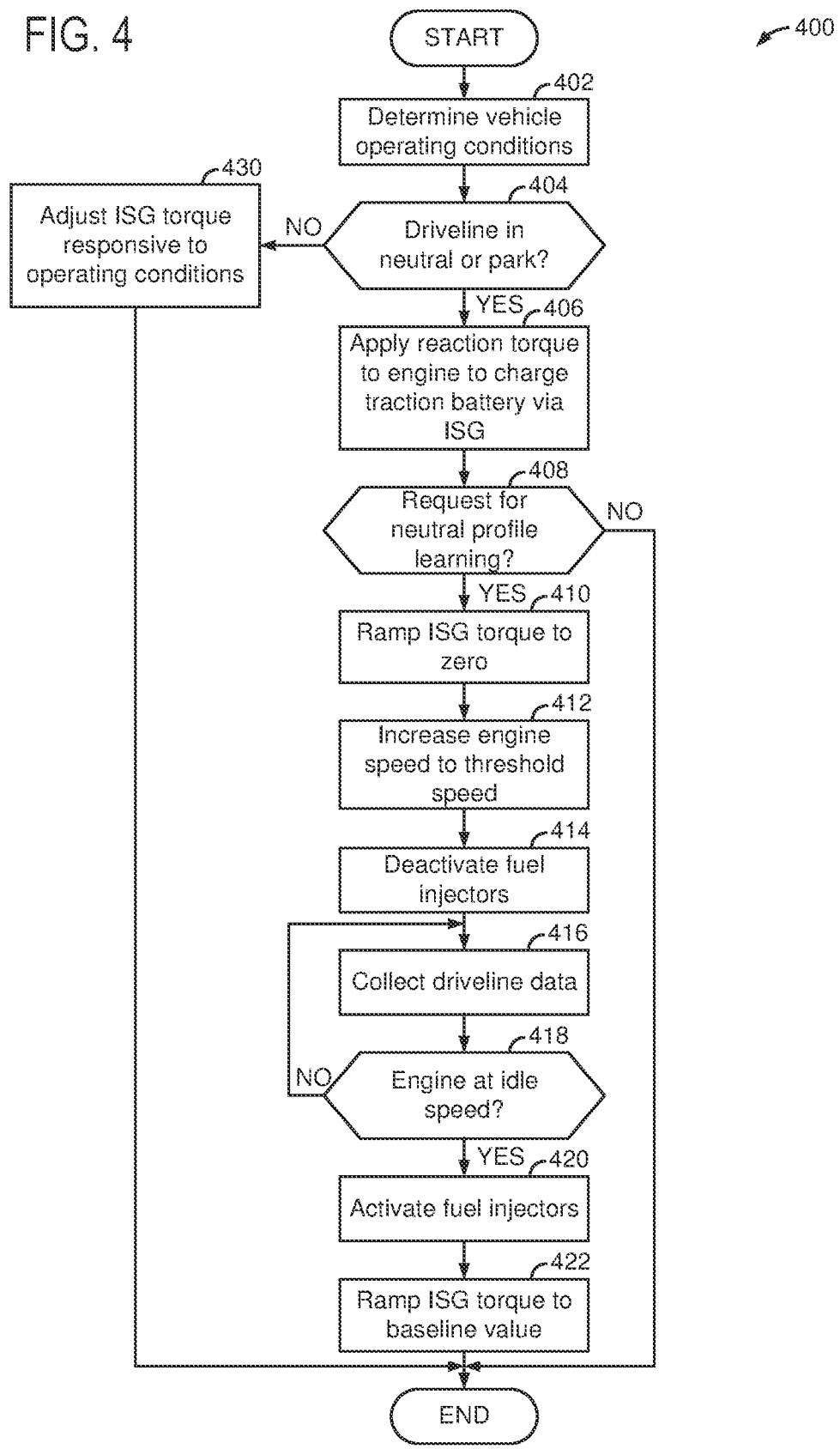
FIG. 4 shows a method for performing a neutral profile learning test.

Referring now to FIG. 4, a method for operating a hybrid vehicle is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequence shown in FIG. 3. Method 400 may be performed immediately following assembly of a vehicle driveline at an end of a vehicle or driveline manufacturing line.

At 402, method 400 determines vehicle operating conditions. Vehicle operating conditions may be determined via receiving sensor outputs as shown in FIGS. 1 and 2 into a controller. Vehicle operating conditions may include but are not limited to engine operating state, transmission fluid temperature, battery state of charge, catalyst temperature, ISG torque, driveline disconnect clutch state, ambient air temperature, engine speed, vehicle speed, engine torque, engine temperature, and driver demand torque or power. Method 400 proceeds to 404 after vehicle operating conditions are determined.

At 404, method 400 judges whether or not vehicle's driveline is engaged in park or neutral. The vehicle's driveline may be engaged in park or neutral via selecting park or neutral via the gear shift selector 290. If method 400 judges that the vehicle is engaged in park or neutral, the answer is yes and method 400 proceeds to 406. Otherwise, the answer is no and method 400 proceeds to 430.

At 430, method 400 adjusts ISG (e.g., 240 of FIG. 2) output torque responsive to vehicle operating conditions. In particular, method 400 may adjust ISG torque in response to a driver demand torque or power. The ISG may be operated as a sole propulsion source or in combination with the internal combustion engine to meet the driver demand torque. In addition, the ISG may be operated in a generating mode when driver demand torque and torque to recharge the traction battery may be provided via the engine. Method 400 proceeds to exit.

At 406, method 400 applies a reaction torque or a torque that resists driveline rotation so that the traction battery may be charged by the ISG. The reaction torque may be referred to as a negative torque since the ISG consumes torque from the driveline to generate electric charge for charging the traction battery. In one example, the reaction torque may be a function of the traction battery state of charge, driver demand torque, and traction battery temperature. Thus, the reaction torque may be determined via the following equation:

$$T_{React} = f(SOC, DD, T_{batt})$$

where $T_{React}$ is the requested ISG reaction torque, f is a function that returns the ISG reaction torque, SOC is traction battery state of charge, DD is driver demand torque or power, and $T_{batt}$ is traction battery temperature. Method 400 charges the traction battery via the ISG. Method 400 proceeds to 408.

At 408, method 400 judges whether or not there is a neutral profile learning request. A neutral profile learning request may be generated via controller 12 a first time the hybrid vehicle driveline is activated immediately following manufacturing of the vehicle. Alternatively or in addition, method 400 may receive a neutral profile learning request from a remote server or cloud based source. The neutral profile learning request may be generated so that operation of the engine may be compared to baseline engine operation. If engine sensor output indicates that the engine is performing differently from a baseline engine profile, operation of the engine may be adjusted to bring engine operation into agreement with baseline engine operation. If method 400 judges that there is a neutral profile learning request, the answer is yes and method 400 proceeds to 410. Otherwise, the answer is no and method 400 proceeds to exit.

At 410, method 400 ramps or incrementally decreases a magnitude of torque output from the ISG to zero. The incremental torque reduction per time increment may be adjustable according to engine and manufacturing constraints and objectives. Thus, whether the ISG is outputting a negative or positive torque, method 400 reduces a magnitude of the torque that is output from the ISG over a time period so that the ISG outputs zero torque. Method 400 proceeds to 412.

At 412, method 400 increases speed of the engine to a threshold speed (e.g., 5000 RPM). The engine speed may be increased via increasing engine torque via adjusting a position of a torque actuator of the engine. Method 400 proceeds to 414.

At 414, method 400 deactivates the engine's fuel injectors and ceases injecting fuel to the engine. As a result, the engine speed begins to decrease. Additionally, method 400 may fully close an engine throttle or adjust a position of the throttle to a predetermined position. Ceasing fuel injection to the engine and adjusting the engine throttle allows engine operating conditions to be compared to baseline engine operating conditions. Method 400 proceeds to 416.

At 416, method 400 collects output of sensors, which may include data, to a controller (e.g., controller 12). The sensor output may be compared to sensor output from a baseline engine so that operation of engine actuators may be adapted so that the engine under test performs similarly to the baseline engine. Method 400 may store data from the various driveline sensors to controller random access memory. Sensor output data may include, but is not limited to engine air flow, engine intake manifold pressure, engine speed, engine position, camshaft position, throttle position, and engine temperature. Method 400 proceeds to 418.

At 418, method 400 judges whether or not engine speed is equal to or less than a second threshold speed (e.g., engine idle speed). If so, the answer is yes and method 400 proceeds to 420. Otherwise, the answer is no and method 400 returns to 416.

At 420, method 400 activates the engine's fuel injectors and the engine begins combusting fuel again. Alternatively, method 400 may not activate the engine's fuel injectors so that the engine speed is reduced to zero. Method 400 may also withdraw the neutral profile learning request and adjust the engine throttle to a predetermined position. Method 400 proceeds to 422.

At 422, method 400 adjusts the ISG torque back to a baseline torque according to the equation mentioned at step 406. In one example, method 400 may incrementally increase or ramp the ISG torque to the baseline reaction torque so that the electric energy storage device may be recharged. Method 400 proceeds to exit.

In this way, operation of a hybrid driveline may be adjusted to reduce influence of an ISG on an engine profile. The engine profile may be generated when the engine is unpowered so that an engine may be compared to a baseline engine without being influenced by fuel or other external factors.

Thus, the method of FIG. 4 provides for a method for operating a driveline, comprising: adjusting a torque applied to the driveline via an electric machine in response a request for a neutral profile learning test request; increasing a speed of an engine in response to the request for the neutral profile learning test request; and deactivating engine fuel injectors in response to the request for the neutral profile learning test request. In a first example, the method includes where adjusting the torque applied to the driveline includes commanding the electric machine to generate zero torque. In a second example that may include the first example, the method further comprises collecting output from one or more engine sensors in response to the neural profile learning test request. In a third example that may include one or both of the first and second examples, the method includes where the engine sensors include an engine position sensor. In a fourth example that may include one or more of the first through third examples, the method includes where the engine sensors include an intake manifold pressure sensor. In a fifth example that may include one or more of the first through fourth examples, the method includes where the engine sensors include an air flow sensor. In a sixth example that may include one or more of the first through fifth examples, the method includes where the fuel injectors are deactivated after the engine reaches a threshold speed. In a seventh example that may include one or more of the first through sixth examples, the method further comprises reactivating the fuel injectors in response to engine speed being less than or equal to a threshold speed.

The method of FIG. 4 also provides for a method for operating a driveline, comprising: adjusting a torque applied to the driveline via an electric machine while a transmission is engaged in park or neutral in response to a request for a neutral profile learning test request; increasing a speed of an engine while the transmission is engaged in park or neutral in response to the request for the neutral profile learning test request; and deactivating engine fuel injectors while the transmission is engaged in park or neutral in response to the request for the neutral profile learning test request. In a first example, the method further comprises collecting output of one or more engine sensors via a controller after adjusting the torque applied to the driveline. In a second example that may include the first example, the method further comprises adjusting the torque applied to the driveline according to a baseline torque calculation in response to withdrawing the neutral profile learning test request. In a third example that may include one or both of the first and second examples, the method further comprises adjusting a position of a throttle plate after increasing the speed of the engine while the transmission is engaged in park or neutral. In a fourth example that may include one or more of the first through third examples, the method includes where adjusting the torque applied to the driveline occurs while a driveline disconnect clutch of the driveline is closed.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a driveline, comprising:
adjusting a torque applied to the driveline via an electric machine in response a request for a neutral profile learning test request;
increasing a speed of an engine in response to the request for the neutral profile learning test request; and
deactivating engine fuel injectors in response to the request for the neutral profile learning test request.

2. The method of claim 1, where adjusting the torque applied to the driveline includes commanding the electric machine to generate zero torque.

3. The method of claim 2, further comprising collecting output from one or more engine sensors in response to the neutral profile learning test request.

4. The method of claim 3, where the one or more engine sensors include an engine position sensor.

5. The method of claim 3, where the one or more engine sensors include an intake manifold pressure sensor.

6. The method of claim 3, where the one or more engine sensors include an air flow sensor.

7. The method of claim 1, where the engine fuel injectors are deactivated after the engine reaches a threshold speed.

8. The method of claim 1, further comprising reactivating the engine fuel injectors in response to an engine speed being less than or equal to a threshold speed.

9. A system, comprising:
an engine;
an integrated starter/generator (ISG);
a driveline disconnect clutch positioned in a driveline between the engine and the ISG; and
a controller including executable instructions stored in non-transitory memory that cause the controller to adjust torque output of the ISG in response to a request for neutral profile learning.

10. The system of claim 9, where adjusting torque output of the ISG includes adjusting torque of the ISG to zero.

11. The system of claim 9, further comprising additional instructions to increase a speed of the engine in response to the request for neutral profile learning.

12. The system of claim 9, further comprising additional instructions to deactivate fuel injectors of the engine after increasing a speed of the engine.

13. The system of claim 9, further comprising additional instructions to collect output of one or more engine sensors in response to the request for neutral profile learning.

14. The system of claim 13, where the one or more engine sensors include an engine air flow sensor.

15. The system of claim 13, where the one or more engine sensors include an engine position sensor.

16. A method for operating a driveline, comprising:
adjusting a torque applied to the driveline via an electric machine while a transmission is engaged in park or neutral in response a request for a neutral profile learning test request;
increasing a speed of an engine while the transmission is engaged in park or neutral in response to the request for the neutral profile learning test request; and
deactivating engine fuel injectors while the transmission is engaged in park or neutral in response to the request for the neutral profile learning test request.

17. The method of claim 16, further comprising collecting output of one or more engine sensors via a controller after adjusting the torque applied to the driveline.

18. The method of claim 17, further comprising adjusting the torque applied to the driveline according to a baseline torque calculation in response to withdrawing the neutral profile learning test request.

19. The method of claim 18, further comprising adjusting a position of a throttle plate after increasing the speed of the engine while the transmission is engaged in park or neutral.

20. The method of claim 19, where adjusting the torque applied to the driveline occurs while a driveline disconnect clutch of the driveline is closed.

\* \* \* \* \*